United States Patent [19]

Lear et al.

[11] Patent Number: 4,934,329

[45] Date of Patent: Jun. 19, 1990

[54] FUEL INJECTION SYSTEM FOR A MULTI-CYLINDER ENGINE

[75] Inventors: Mark Lear, Tauranga, New Zealand; Sam R. Leighton, Nedlands, Australia; Christopher N.F. Sayer, Ferndale, Australia; Ian R. Thompson, Duncraig, Australia

[73] Assignee: Orbital Engine Company Proprietary Limited, Balcatta, Australia

[21] Appl. No.: 294,627

[22] PCT Filed: Apr. 5, 1988

[86] PCT No.: PCT/AU88/00096
§ 371 Date: Jan. 30, 1989
§ 102(e) Date: Jan. 30, 1989

[87] PCT Pub. No.: WO88/07628
PCT Pub. Date: Oct. 6, 1988

[30] Foreign Application Priority Data

Apr. 3, 1987 [AU] Australia ............................. PI1246
Jul. 20, 1987 [AU] Australia ............................. PI3270
Oct. 26, 1987 [AU] Australia ............................. PI5101

[51] Int. Cl.⁵ ..................... F02M 69/08; F02M 55/00; F02M 67/02
[52] U.S. Cl. ..................................... 123/531; 123/456; 239/408; 239/416.5; 239/417.5; 239/585
[58] Field of Search ............... 123/456, 470, 531, 533; 239/408, 416.5, 417.5, 585

[56] References Cited

U.S. PATENT DOCUMENTS

| | | | |
|---|---|---|---|
| 1,627,727 | 5/1927 | Charter | 123/531 |
| 3,125,078 | 3/1964 | Reiners | 123/470 X |
| 3,514,082 | 5/1970 | Haase | 123/55 VS X |
| 3,782,639 | 1/1974 | Boltz et al. | 123/472 X |
| 4,197,996 | 4/1980 | Giardini | 239/585 X |
| 4,360,164 | 11/1982 | Bellicardi et al. | 239/585 |
| 4,475,486 | 10/1984 | Kessler 123 | 52 M/ |
| 4,539,961 | 9/1985 | Atkins et al. | 123/468 |
| 4,570,602 | 2/1986 | Atkins et al. | 123/468 |
| 4,708,117 | 11/1987 | Mesenich et al. | 123/445 X |
| 4,841,942 | 6/1989 | McKay | 123/533 |

Primary Examiner—Tony M. Argenbright
Attorney, Agent, or Firm—Armstrong, Nikaido, Marmelstein, Kubovcik & Murray

[57] ABSTRACT

A fuel injection system for a multi-cylinder internal combustion engine, which includes a rigid elongated unitary member incorporating a gas supply duct, a fuel supply duct and a fuel return duct, each of which extends in the direction of elongation of the unitary member. A separate fuel metering device and fuel injecting device is provided for each engine cylinder. The fuel metering device is arranged to deliver metered quantities of fuel to the fuel injection device and is in communication with the fuel supply and fuel return ducts so that fuel can be circulated through each of the fuel metering devices. The fuel injecting devices are each in communication with the gas duct and communicable with one of the engine cylinders. The fuel injection devices are adapted to effect delivery of a metered quantity of fuel entrained in gas supplied from the gas duct when the fuel injecting device is in fluid communication with a cylinder.

27 Claims, 7 Drawing Sheets

FUEL INJECTION SYSTEM FOR A MULTI-CYLINDER ENGINE

This invention relates to a fuel injection system for internal combustion engines having two or more cylinders and wherein metered quantities of fuel are delivered to the respective cylinders entrained in a gas, preferably a combustion supporting gas, such as air.

It has previously been proposed to deliver a metered quantity of fuel to an engine entrained in a body of gas, with the pressure of the gas being sufficient to effect delivery of the fuel either directly into the cylinder of the engine or into the induction system through which the air charge passes for delivery to the cylinder. This form of fuel metering and injection requires the supply of both fuel and gas to each metering and injecting unit associated with the respective cylinders of the engine. Also, most fuel metering devices require the fuel to be circulated therethrough to prevent the collection of fuel vapour therein. Accordingly, in a multi-cylinder engine, having an individual fuel metering device for each cylinder, it is necessary to provide for fuel to be returned from each fuel metering device to the principal fuel source, such as the fuel reservoir. Further, it is normally necessary to provide a substantially fixed pressure differential between the fuel supply and the gas supply, as this differential is relevant to the metering characteristics of the fuel metering device, and variations therein can result in inaccuracy in the fuel metering process.

Because of manufacturing cost considerations, it is customary to provide a single pump which provides the fuel circulation from a fuel reservoir to each of the fuel metering devices, with appropriate return lines to the fuel reservoir from each metering device. Also it is customary for cost saving reasons to provide a single pressure regulator to control the pressure differential between the gas and the fuel as supplied to each fuel metering and injecting unit. This construction results in a multitude of fuel lines between the fuel metering and injection units and the fuel pump, and between said units and the pressure regulator, which significantly contribute to manufacturing costs. It will be appreciated that in this construction the fuel and gas lines must be provided with suitable end connectors, which are usually threaded in order to provide an effective leak proof connection, and the provision of complementary threaded components on the fuel metering and injecting units, fuel pump and pressure regualtor. The manufacture and assembly of these multiplicity of threaded components is a further cost factor. Also additional costs are involved in the installing of the numerous fuel and gas lines. Further the multitude of fuel and gas lines detract from the overall neatness of the installation.

The use of the number of lines for the fuel and gas also present operational disadvantages as the resilient nature of the plastic lines usually used results in variations in line cross-sectional area with internal pressure, and so it is difficult to maintain the required control of the pressure differential between the fuel and gas supplies.

In many engine applications, such as automobiles and outboard marine engines, the physical size of an engine and its associated accessories is of major importance. There is limited scope for reduction in the size of the engine itself, and accordingly it is important to maintain to a minimum the extent that accessories, added to the basic engine, increase the overall size thereof.

In the light of the above discussed construction, operational and cost disadvantages of currently known fuel injection systems, it is the object of the present invention to provide an improved system whereby these disadvantages are at least reduced so as to provide a more effective operational system and to also reduce the manufacturing and installation costs of the system.

With this object in view, there is provided according to the present invention a fuel injection system for a multi-cylinder internal combustion engine comprising a rigid elongated unitary member having formed therein a gas supply duct, a fuel supply duct and a fuel return duct, each said duct extending in the direction of elongation of the unitary member and each adapted for connection to a gas supply, a fuel supply and a fuel return respectively, at least one fuel metering and injecting apparatus for each cylinder of the engine each integrated with the unitary member and each comprising a fuel metering means and a fuel injecting means, the fuel metering means being adapted to deliver metered quantities of fuel to the fuel injecting means, each fuel metering means being in communication with the fuel supply and fuel return ducts so that in use fuel can be circulated through each fuel metering means, and each fuel injecting means being in communication with the gas duct and communicable with a respective cylinder directly or induction duct communicating with a respective cylinder of the engine, each said fuel injecting means being adapted to effect delivery of the metered quantity of fuel entrained in gas supplied from the gas duct when the fuel injecting means is in communication with the cylinder or induction duct.

Conveniently there is also integrated with the unitary member a pressure regulating means which controls the pressure differential between the fuel in the fuel supply duct and the gas in the gas supply duct between predetermined limits. Preferably the pressure regulating means controls the rate of return of fuel from the return duct to a fuel reservoir and so regulates the pressure of the fuel in the fuel supply duct. It is preferable that the pressure of the fuel delivery to the fuel supply duct is such that the regulating means is required to return fuel to the reservoir over substantially the whole range of operating conditions of the engine. This ensures circulation of fuel through the fuel metering means is maintained to thereby reduce the possibility of an accumulation of fuel vapour in the fuel supply or return ducts. The presence of such vapour, apart from creating a vapour handling problem in relation to emissions control, also contributes to the effective maintenance of the required pressure differential between the fuel supply and the gas supply.

Conveniently each fuel metering means has a body with spaced fuel inlet and fuel outlet ports and the fuel metering means body extends into the elongate unitary member in a direction transverse to the direction of elongation of the unitary member so the fuel inlet port is located in the fuel supply duct and the fuel outlet port is located in the fuel return duct. Each fuel metering means body has a fuel metering port through which the metered quantity of fuel is delivered, and preferably each fuel metering means body is located so the fuel metering port delivers the fuel into a respective fuel cavity located within the unitary member, each fuel cavity being in communication with the gas supply duct. The fuel cavities may be formed in the unitary member or may be part of the fuel injecting means that extends into the unitary member.

Preferably the fuel supply and return ducts and the gas duct are arranged so that the fuel metering means body projects into the unitary member in a direction inclined to the direction that the fuel injection means projects into the unitary member. Conveniently each fuel metering means body extends into the unitary member from one side thereof and each fuel injection means includes a body that extends from another side of the unitary member so as to be located generally at a right angle to the fuel metering means body. This arrangement contributes to containing the extent by which the componentry of the fuel injection system increases the overall outside dimensions of the final engine assembly, as at least part of the body of the fuel metering means and/or the fuel injection means body may be located within the elongated unitary member.

Preferably each fuel cavity is a passage formed within the unitary member located to receive the metered quantity of fuel from the fuel metering means and to deliver it to the fuel injecting means. Conveniently the arrangement is such that the fuel is delivered into the fuel cavity at a level above the fuel injecting means so gravity will assist in the transporting of the fuel to the fuel injecting means. Preferably the fuel cavity communicates with the gas supply duct at a level above that of the entry of the fuel to the cavity so the flow of gas from the gas supply duct to the fuel injecting means will promote the flow of fuel to the fuel injecting means. The fuel cavity may be configured to present, opposite the location of entry of the fuel, a face inclined to the trajectory of the incoming fuel so the fuel rebounding off that face will be deflected toward the fuel injecting means.

The above discussed construction incorporating a unitary rigid member providing fuel and gas to a plurality of fuel metering and injecting means, each servicing a respective cylinder of a multi-cylinder engine, substantially reduces the number of fuel and gas lines required in the installation. In particular, only a single fuel supply line from the fuel pump and a single gas supply line from the pressurised gas source are required to service all of the fuel metering and injecting means. Further only a single fuel return line is required from the unitary member to the fuel reservoir for by-passing excess fuel. Apart from the substantial improved appearance which arises from this construction, the reduction in the number and length of resilient fuel and gas lines substantially reduces the effects on metering accuracy arising from variation in the cross-section of these lines with variation of the fluid pressure therein. In addition the number of fuel and gas connections required to be made is substantially reduced, which contribute to both space savings and cost savings and to a reduction in the potential areas of leakage in the system.

Further, it is possible by the use of a rigid elongate unitary member carrying a number of fuel injecting means, one to be associated with each cylinder of the multi-cylinder engine, to use the rigid elongate unitary member as a holding down bar that clamps the fuel injecting means in the required assembled relation with the respective cylinders of the engine. Accordingly, the need to provide individual threaded holes for the securement of the respective fuel injection means to each cylinder is avoided, and a lesser number of threaded holes is required to hold the rigid elongate unitary member in clamping relation with the fuel injection means and the engine structure to maintain all of the fuel injecting means in the required operating relationship to the engine.

A number of operational factors must also be considered in the design of the metering and injecting unit, including such factors as the weight of the valve controlling the delivery of fuel, including the valve stem, as inertia loadings and valve bounce are important in the maintenance of accurate fuelling. Also the extent of the surfaces wetted by the fuel after it has been metered influences the variations in fuel quantity delivered to the engine on a cycle to cycle basis, and the response of the engine to changes in the metered quantity of fuel. There is also the necessity to protect the fuel metering and injecting unit from heat build-up that may damage electrical components and/or lead to fuel vaporisation or other hot fuel handling problems.

It is therefore desirable to provide apparatus for delivering fuel to an internal combustion engine that is small and compact and will operate with the required reliability, accuracy and durability demanded with modern engines.

There is therefore proposed a fuel injection system for an internal combustion engine comprising a body having an internal port cavity, a port in the body providing communication between the port cavity and the exterior of the body, valve means to selectively open and close said port, said valve means including a valve element adapted to co-operate with the port to close same and a valve stem attached to the valve element and extending through the port cavity, selectively energisable electromagnetic means within the body disposed about and operably connected to the valve stem whereby the valve element is displaced to open the port when the electromagnetic means are energised, a passage through the valve stem communicting the port cavity with a fuel cavity located at that side of the electromagnetic means opposite to the port, metering means to selectively deliver fuel to the fuel cavity, and means to supply gas to the fuel cavity at least when the port is open to convey fuel from the fuel cavity through the valve stem passage and the port cavity to and through the open port.

Conveniently the electromagnetic means is in the form of a solenoid having a coil disposed concentric to the valve stem with a co-axial armature attached to the valve stem. Preferably the armature extends into, or is located substantially within, an annular space between the coil and the valve stem. The valve stem is preferably of tubular form with the valve element secured to one end and the other end open to receive the fuel. At the valve element end communication is provided between the interior of the tubular valve stem and the port cavity. Preferably the communication is arranged so a significant quantity of fuel may not be trapped in the tubular valve stem below the point of communication with the port cavity and so not pass into the port cavity. Conveniently the fuel may be injected from the port directly into a combustion chamber of the engine.

In the above proposed construction, a number of benefits arise in the operation of the fuel injection system. The passing of the fuel through a passage in the valve stem, such as is provided by the tubular valve stem, reduces the surface area to which the fuel is exposed as it passes from the point of metering to the port through which it is delivered to the engine, particularly in comparison with prior constructions where the fuel has passed through an annular passage. The surface area wetted by the fuel influences the delay that may occur between the variation of the fuelling rate at the point of metering and the consequent variation at the port where the fuel is delivered to the engine. During each injection cycle, and with changes in fuelling rates, there is a change in the thickness of the film of fuel adhering to the surfaces over which the fuel passes from the metering point to the port. Accordingly, if the surface area in contact with the fuel is reduced there is a reduction in the total quantity of fuel involved in changes in thickness of the fuel film. This is reflected in an improvement in the response time of the engine and a reduction in instability of the engine arising from variability in the quantity of fuel delivered between each cycle of the engine.

There is also a benefit arising from locating the electromagnetic means, such as the solenoid assembly, between the injection port and the fuel metering point, as compared with previously proposed constructions wherein the fuel metering point is between the solenoid and the injection port. The resulting reduction in the length of the valve stem reduces the weight theeof, and reduces the natural frequency of the valve stem, and hence reduces the amount of valve bounce that may occur on valve closure. The relatively large quantities of fuel passing through the valve stem when the engine is operating at high loads provides a significant cooling effect on the solenoid at a time when the rate of heat generation is high.

Also, location of the solenoid assembly between the injection port to the engine and the metering point, and the symmetric external shape of the solenoid, enables that portion, or part thereof, of the fuel injection apparatus to be recessed into the head of the engine to which the apparatus is fitted, thereby providing a reduction in the overall height of the engine and injector apparatus assembly. This location also provides the ability for thefuel to be raised in temperature by heat input from the cylinder head, particularly at low fuelling rates, and will assist in atomisation.

The invention will now be described with reference to the accompanying drawings, which depict one practical arrangement of a fuel injection system incorporating the present invention.

Figure 1:
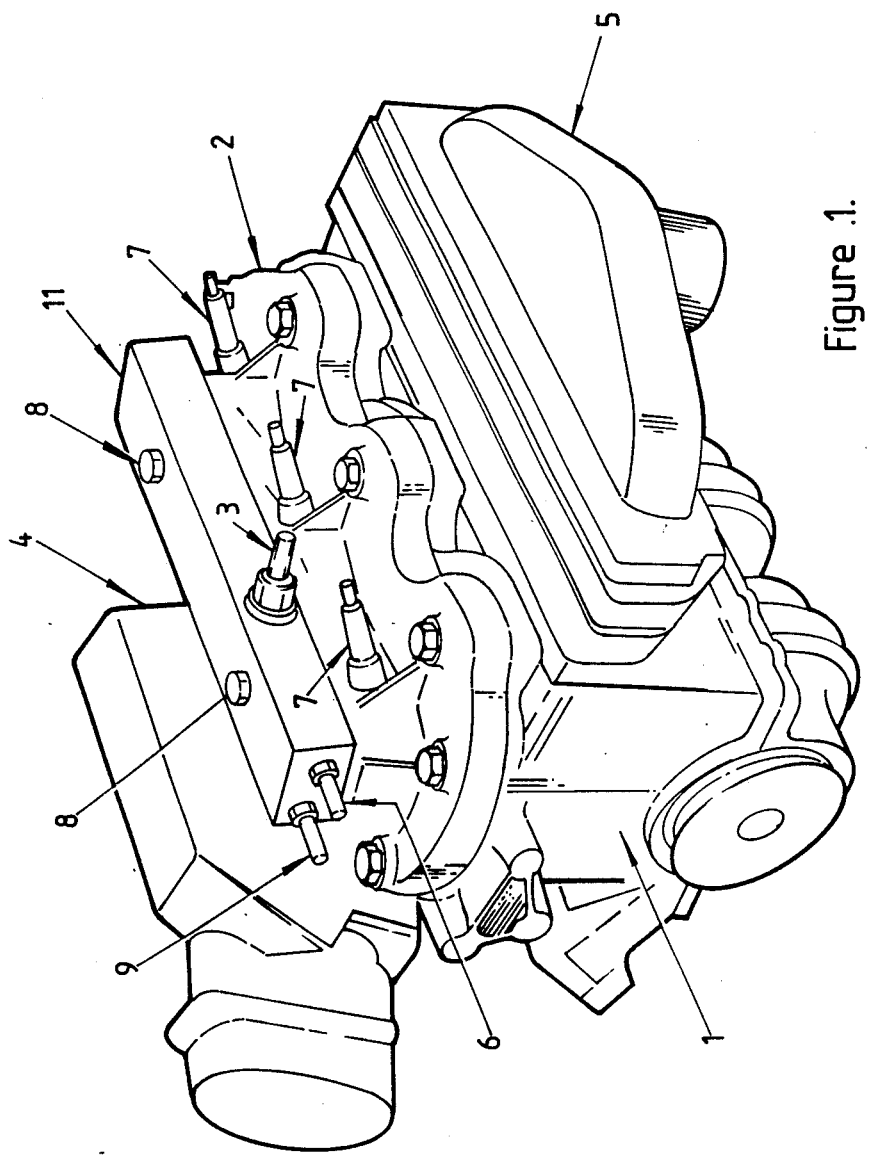
FIG. 1 is a perspective view of a typical three cylinder engine having a fuel injection system of the present invention fitted thereto.

Referring now to FIG. 1 of the drawings, the three cylinder two stroke cycle engine depicted therein is of basically conventional construction, having a cylinder block and crankcase unit 1, a detachable cylinder head 2, and an air induction system 4 on one side of the cylinder block and an exhaust system 5 on the opposite side of the block. Fitted to the cylinder head 2 are respective spark plugs 7, one for each cylinder of the engine. Extending generally centrally along the top of the cylinder head is the fuel and air rail unit 11 attached to the cylinder head by the mounting bolts 8.

Figure 2:
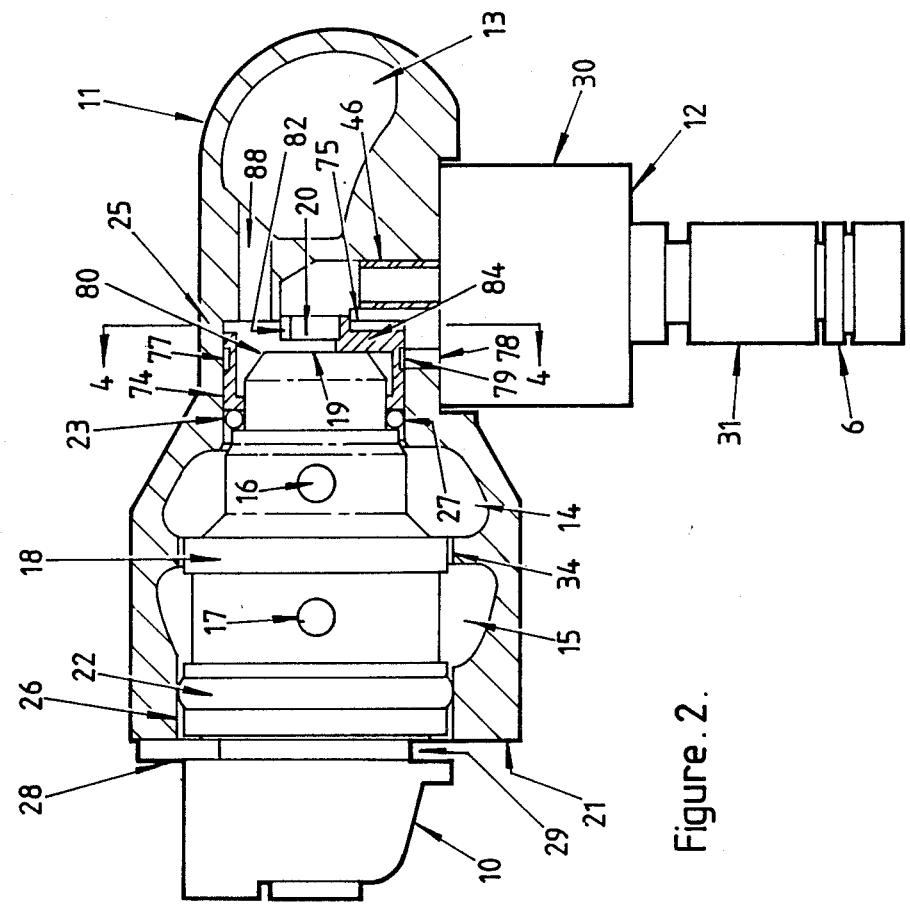
FIG. 2 is a transverse sectional view of the fuel and gas rail at the location of a fuel metering and injecting unit.

The fuel injection system for the engine as shown in FIG. 2 comprises the air and fuel supply rail unit 11, with a metering unit 10 and an injecting unit 12 for each engine cylinder. The rail unit 11 is an extruded component with internal longitudinaly extending air passage 13, fuel supply passage 14, and fuel return passage 15. These passages are closed at each end of the rail. At appropriate locations, as seen in FIG. 1, there are provided an air supply conduit connector 9 communicating with the air passage 13, a fuel supply conduit connector 6 communicating with the fuel supply passage 14, and a fuel return conduit connector 3 communicating with the fuel return passage 15 via a pressure regulator as hereinafter described.

The fuel metering unit 10 is a commercially available component and will not be described in detail herein. A suitable commercially available metering unit is that marketed by Rochester Products Division of General Motors Corporation under the Trade Mark "Multec". A fuel inlet port 16 and a fuel outlet port 17 are provided in the body 18 of the metering unit 10 to permit the flow of fuel therethrough, and a metering nozzle is provided in the area 19 to deliver fuel to the passage 20, as hereinafter described.

The body 18 of the metering unit 10 is received within a lateral bore 26 provided in the external wall 21 of the rail unit 11, with an "O" ring seal 22 between the body 18 and the bore 26, and a further "O" ring seal 23 between the body 18 and the bore 27 in the internal wall 25 between the air passages 13 and fuel supply passage 14. The position of the nozzle area 19 of the metering unit 10 with respect to the passage 20 is controlled by the clamp plate 28 received in the recess 29 provided in the body 18. The clamp plate 28 is held against the wall 21 by a suitably located bolt or set screw (not shown). The body 18 of the metering unit passes through the wall between the passages 14 and 15 at 34 with a close tolerenced fit so fuel leakage therebetween is very restricted.

Figure 3:
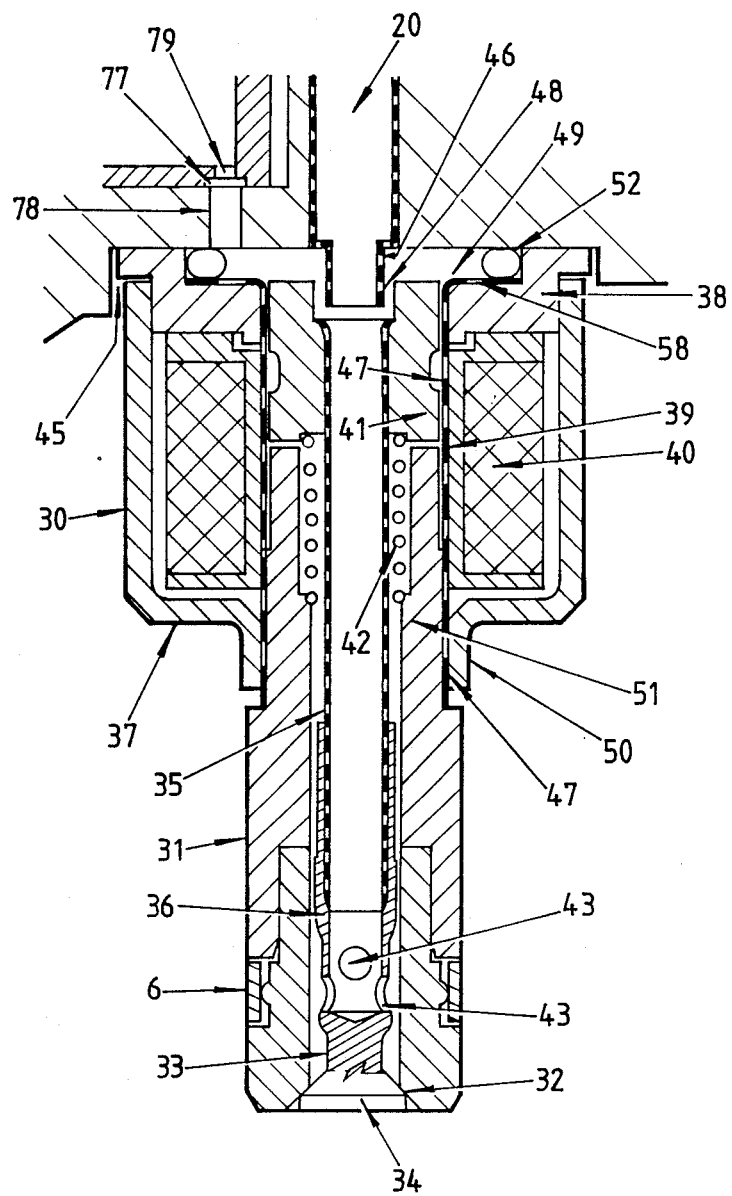
FIG. 3 is an axial sectional view of fuel injecting unit and an adjoining portion of the fuel and gas rail.

The injecting unit 12 as seen in FIG. 3 has a housing 30 with a cylindrical spigot 31 projecting from the lower end thereof with an injection port 32 therein communicating with an internal cavity 33. The poppet valve head 34, which co-operates with the port 32, is secured to the tubular valve stem 35. The tubular valve stem 35 is slidably supported in the cavity 33 by guide ribs 36 spaced equally about the periphery of the valve stem 35.

The solenoid coil 40 is located in the housing 30 concentric with the tubular valve stem 35 and is retained between the base 37 of the housing 30 and the cover-plate 38. The solenoid armature 41, affixed to the upper end of the tubular valve stem 35 has limited axial movement as indicated by the gap 39 and is urged in an upward direction by the spring 42 to normally maintain the valve head 34 in a closing relation with the port 32. The lower end of the valve stem 35 is provided with opposed apertures 43 to provide constant communication between the interior of the stem 35 and the cavity 33. Energising of the solenoid coil 40 draws the armature 41 downward to close the gap 39, thereby displacing the stem 35 and valve head 34 to open the port 32.

The cover plate 38, being the upper end of the housing 30, is received in the bore 45 in the rail unit 11 so that the bore 48 at the upper end of the armature 41 receives the tube 46 mounted in the rail unit 11. The tube 46 is a sealed press fit in passage 20 formed in the wall 25, of the rail unit 11, and directs the fuel from the passage 20 into the open upper end of the valve stem 35.

Figure 4:
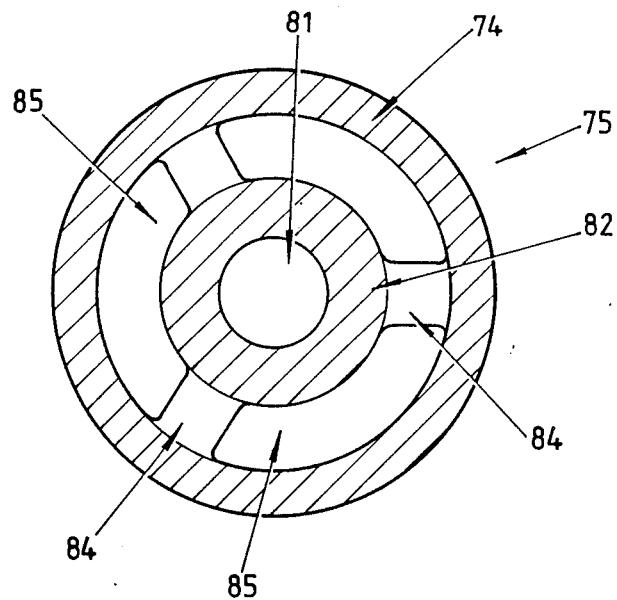
FIG. 4 is a view of the air control ring in the direction 4—4 in FIG. 2.

Attached to the end of the metering unit 10 which is located in the bore 27 in the wall 25 of the rail unit 11 is an air flow control ring 75. The annular flange 74 of the air flow control ring 75 fits over the metering unit body 18. In the external face of the flange 74 is an annular groove 77 which communicates with the passage 78, and via the series of apertures 79 with the interior cavity 80 of the ring 75. As seen in FIG. 4 of the drawings, the end of the ring 75 has a central fuel passage 81 defined by the collar 82, which is secured to the peripheral portion of the ring 75 through the three equally spaced arms 84. The spaces defined between the periphery of the ring 75, the central collar 82 and the three arms 84 define three arcuate openings 85 for the flow of air from the air passage 13.

As seen in FIG. 2, the passage 88 communicates the air passage 13 with the annular cavity 80 about the collar 82 whereby air from the air passage 13 may pass through the passage 88 and the arcuate openings 85 and hence into the internal cavity 80 within the ring 75. This air can then pass adjacent the nozzle area 19 into the fuel passage 81 through the collar 82. It will thus be seen that when the fuel injection system is in operation air may pass from the air passage 13 to establish a radially inward flow around the area 19 of the metering unit 10, from which the metered quantity of fuel is delivered, and that air will then move axially through the passage 81 into the passage 20 to then pass through the tube 46 into the hollow interior of the valve stem 35. This form of air flow will inhibit the loss of fuel by a back flow through the passage 88 into the air passage 13.

The annular groove 77, apertures 79 and passage 78, provide a substantially unrestricted flow path for air from the air passage 13 into the bore 49 in the cover plate 38. From the bore 49 the air may enter the hollow valve stem 35 and also pass between the external surface of the armature 41 and the sleeve 47, through the gap 39 and into the cavity 33. This communication between the air passage 13 and the cavity 33 maintains an air flow and a pressure in the cavity 33 sufficient to prevent an accumulation of fuel in, or a back flow of fuel from, the cavity 33 past the armature 41 that could detract from the accuracy of the fuel metering to the engine.

The sleeve 47 is outwardly flanged at 58 to seat on the base of the bore 49 in the cover plate 38. The lower end of the sleeve 47 is located between the neck 50 of the housing 30 and the extension 51 of the spigot 31. These three components are welded together in the area of overlapping relation to form a fuel and air tight junction.

Figure 5:
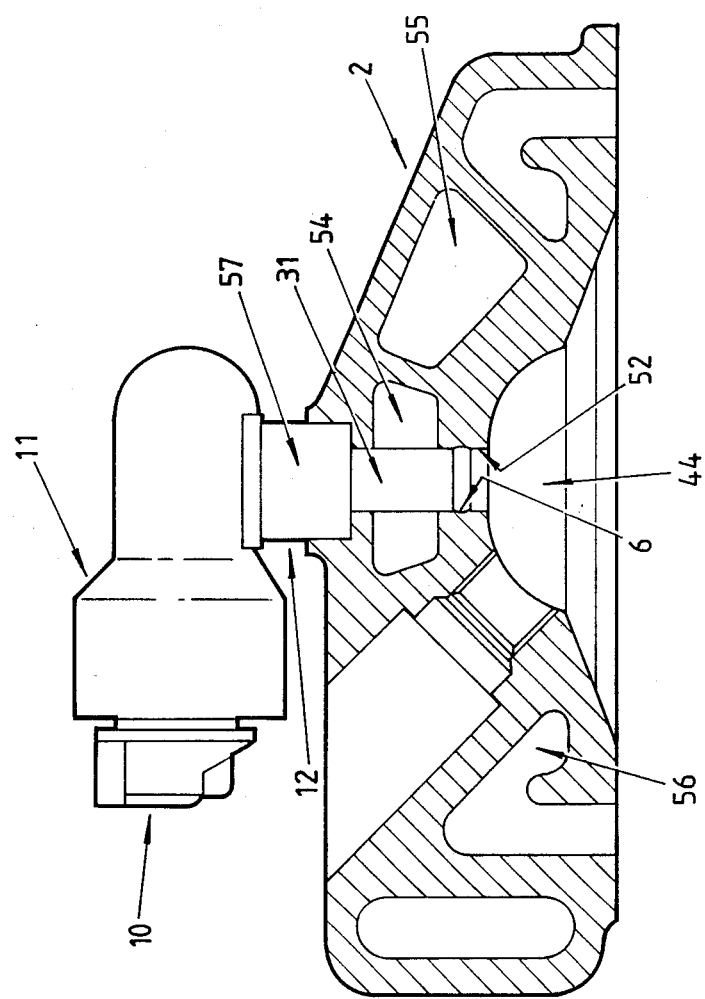
FIG. 5 is a sectional view of an engine cylinder head with the fuel and gas rail and the fuel metering and injecting units installed thereon.

The apparatus as above described is intended to be used on a multi-cylinder engine as shown in FIG. 1 with the single air and fuel rail unit 11 having assembled thereto a metering unit 10 and injecting unit 12 for each cylinder of the engine. As seen in FIG. 5 the spigot 31 of the injecting unit 12 is received in an appropriate stepped bore 57 in the engine cylinder head 2 so that the fuel delivered through the port 32 will directly enter the cylinder combustion chamber 44. The seal ring 6, located in the spigot 31 will seal against an appropriate surface of the cylinder head. Suitable clamping arrangements, such as the bolts 8, are provided to secure the rail unit 11 to the cylinder head 2, so that the rail unit 11 is held in assembly with the injecting units 12, and the injecting units are in turn held in assembly with the cylinder head. The "O" ring 52 located in the bore 49 forms a seal between the rail unit 11 and the flange 58 of the sleeve 47 to prevent leakage of fuel or air between the rail unit 11 and the injecting unit 12.

As can be seen in FIG. 5, the engine cylinder head has coolant cavities and passages 53, 54 and 55, and a spark plug opening 56. The injection unit 12 received within a stepped bore 57, has part of the housing 30 disposed within the coolant cavity 54, so as to provide direct cooling of the injection unit to dissipate the heat generated by the solenoid coil 40 and to limit the transfer of heat from the combustion chamber to the injector unit and metering unit.

Figure 8:
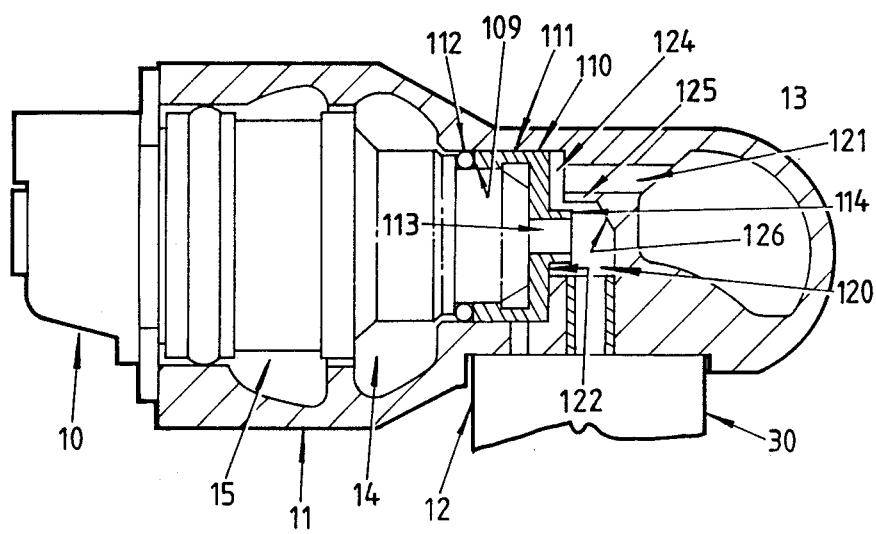
FIG. 8 is a fragmentary sectional view of an alternative arrangement of directing the fuel and air into he fuel cavity.

In FIG. 8 there is provided a modified construction of the air control ring 75 as described with reference to FIG. 2. In the construction shown in FIG. 8 the sleeve 110 and fuel guide tube 114 replace the fuel control ring 74 and collar 82.

It is to be noted that the provision of the sleeve 110 is a modification to the previously disclosed construction. The sleeve 110 is a close fit, preferably a light interference fit in the bore 111 in the rail unit 11, with the portion 109 of the fuel metering unit 10 a close fit in the sleeve 110. The 'O' ring 112 prevents leakage of fuel from the fuel supply passage 14.

The delivery nozzle of the fuel metering unit 10 is located at 113, in alignment with the fuel guide tube 114 formed integral with the sleeve 110, and delivers the metered quantity of fuel into the fuel cavity 120. The fuel injecting unit 12 is in communication with the cavity 120 to receive the fuel therefrom and is of the same construction as previously described with reference to FIG. 2.

The cavity 120 is in communication with the air passage 13 via the bore 121, annular passage 122 surrounding the fuel guide tube 114, and the arcuate passage 124 therebetween. The bore 121 and the outer wall of the annular passage 122 are formed by respective parallel holes drilled prior to assembly of the fuel metering unit 10 and sleeve 110, and the arcuate passage 124 is formed by machining away portion of the wall between these two holes. As a result of these machining operations, the wall portion 125, between the two holes is retained and extends to over-lap part of the fuel guide tube 114, and a part conical surface 126 extending over an arc of 180° is formed. It is to be noted that the cavity 120, bore 121, annular passage 122 and arcuate passage 124 are individual to each metering and injecting units 10 and 12, where the fuel supply and return passage 14 and 15 and air supply passage 13 are common to all such units. The inclination of the surface 126 will direct fuel rebounding thereoff towards the injecting unit 12 rather than directly back towards the annular passage 122.

In use, during a fuel injection phase, an air flow exists from the passage 13 through the bore 121 arcuate passage 124 and annular passage 122 into the cavity 120, and on through the cavity 120 to the fuel injecting unit 12. This air flow carries the fuel that has been delivered into the cavity 120, by the fuel metering unit 10, into and through the fuel injecting unit 12 to deliver it to the engine.

It is not uncommon to deliver the fuel, or at least part thereof, into the cavity 120 prior to the commencement of the injection of fuel into the engine, that is at a time when there is substantially no air flow into the cavity 120 from the air passage 13. The above described arrangement of the bore 121 and passages 122 and 124 are such that a tortuous path is presented to any fuel that may otherwise have a tendency to flow back from the cavity 120 into the air passage 13. Also fuel droplets rebounding off the surfaces of the cavity 120, after issuing from the metering unit 10, have a high probability of striking another wall of the cavity or of the annular passage 122, and so dissapate their kinetic energy and/or be directed on a path that will avoid escape of the fuel into the air passage 13. The use of an annular passage, as in annular passage 122, to provide the only point of entry of any fuel from the cavity 120 to a path to the air passage 13, has the advantage of providing a relatively unrestricted flow area for the air passing to the cavity but presents a narrow opening to fuel droplets passing in the reverse direction.

The prevention of the escape of fuel from the cavity 20 in FIG. 2 or 120 in FIG. 8 to the air passage 13 has the advantage of improving the accuracy of metering the fuel to the engine with resultant improvements in fuel efficiency and emissions control of the engine, and avoidance of fuel accumulation in the air passage and the problem of purging thereof.

As the fuel is delivered from the metering unit 10 into the passage 20 against the air pressure which exists therein, being substantially the pressure in the air passage 13, it is necessary to regulate the fuel pressure with respect to the air pressure to obtain the required accuracy in the metering of the fuel. As a plurality of metering and injecting units are incorporated in the single rail unit 11, the provision of a single regulator, also incorporated into the rail unit 11, can provide the required pressure regulation for all metering and injecting units.

Figure 6:
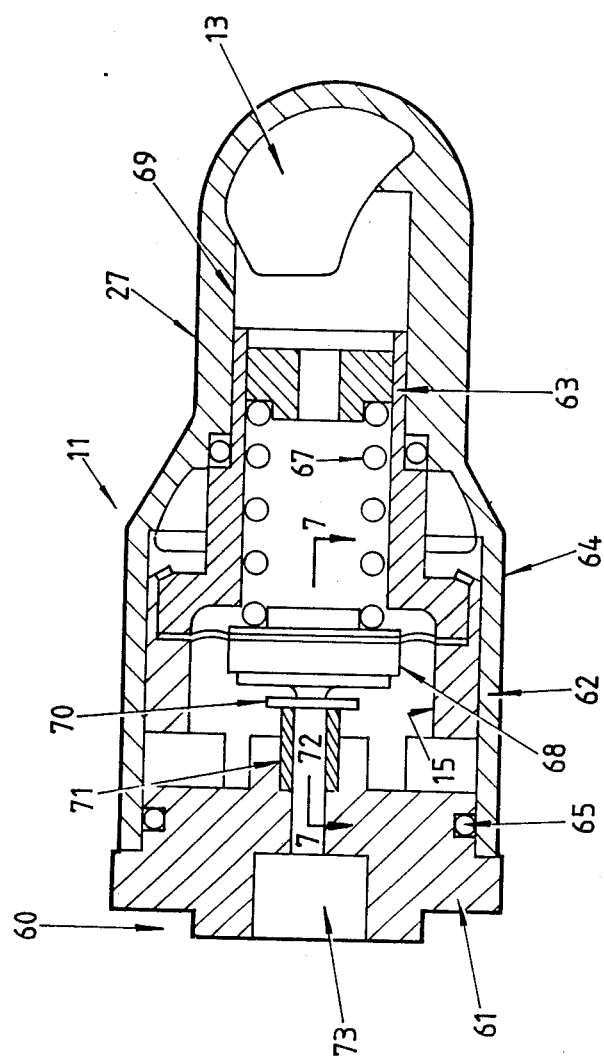
FIG. 6 is a sectional view of a pressure regulator fitted to the fuel and gas rail.

A typical construction of a regulator unit is depicted in FIG. 6 of the accompanying drawings. The regulator unit 60 comprises a body 61 having a fuel portion 62 and an air portion 63 secured together by the swaged flange 64. The fuel portion 62 is a close fit in the bore 56 that extends through the external wall 21 of the rail unit 11 and also through the wall 74 between the fuel supply passage 14 and the fuel return passage 15. The fuel return passage 15 communicates with the hollow interior of the fuel portion 62 through apertures 59 in the peripheral wall of the fuel portion 62. An "O" ring seal 65 is provided between the fuel portion 62 of the body 61 and the wall of the rail unit 11. The fuel portion 62 also extends partly into the wall 25 between the fuel supply passage 14 and the air passage 13 with the air portion 63 extends through the remainder of the wall 25 into the air passage 13.

The diaphragm 66 is clamped between opposite shoulders on the fuel portion 62 and air portion 63 so as to form a barrier between the fuel and the air, but may flex in the normal manner of a diaphragm. The pre-load spring 67 acts against the pressure plate 68 secured to the diaphragm 66 and the force applied by the spring can be controlled by the adjusting plug 69, which has an aperture therethrough to communicate the air passage 13 with the interior of the air portion 63.

Figure 7:
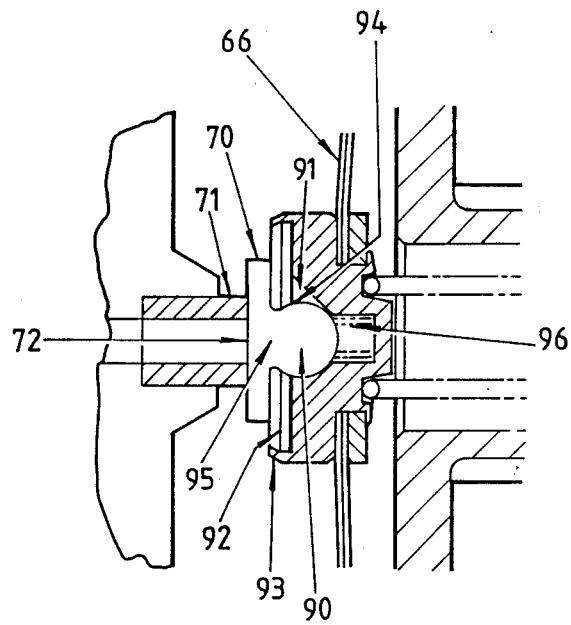
FIG. 7 is a fragmentary sectional view of portion of the pressure regulator along the line 7—7 in FIG. 6.

The pressure plate 68 carries a valve disc 70, which co-operates with the port sleeve 71, which defines the port 72. The body 61 is provided with a suitable threaded aperture 73 to which a fuel return connector 3 may be fitted to return released fuel to a fuel reservoir. As seen in more detail in FIG. 7, the valve disc 70 may be of a form having an integral spherical head 90 received in a conical cavity 91 in the pressure plate 68. The head 90 is held in assembly by the retainer plate 92, that is secured about the periphery by the swaged rim 93 of the pressure plate 68. The retainer plate 92 has a slot extending to the periphery thereof from the central opening 94 to permit entry of the neck portion 95 into the central opening 94. The spring 96 urges the spherical head 90 toward the retainer plate 92 to maintain the central location of the valve disc 70. This construction improves the accuracy of the sealing of the valve disc 70 with port sleeve 71.

It is to be understood that the construction of the regulator above described may be varied by having the port sleeve 71 attached to the diaphragm 66 and the valve disc stationary.

In use, if the fuel pressure remains below the pressure represented by the combined affect of the air pressure on the diaphragm 66 and the load applied by the spring 67, the valve plate 70 will remain in the position as shown closing the port 72. However, if the fuel pressure rises to a level sufficient to overcome the combined load of the air pressure and spring 67 on the diaphragm 66, then the diaphragm will deflect to the right as shown in the drawing, thereby displacing the valve disc 70 to open the port 72. The fuel released through the port 72 is returned to the fuel reservoir.

The above described construction results in the regulator device being substantially contained within the confines of the rail unit 11 and thus does not in real terms contribute to an increase in the overall dimensions of the engine and fuel injection system. Also in this construction the volume of fuel within the rail unit damps the pressure fluctuations arising from the operation of the regulator.

It is to be understood that the fuel injection system as above described may be used in respect of any form of internal combustion engine, including engines operating on either the four stroke or two stroke cycle. Such engines incorporating the fuel injection system above described are particularly suitable for use in all forms of vehicle engines, including engines for aircraft, land vehicles and marine applications, the latter including outboard marine engine.

The claims defining the invention are as follows:

1. A fuel injection system for a multi-cylinder internal combustion engine comprising a rigid elongated unitary member having formed therein a gas supply duct, a fuel supply duct and a fuel return duct, each said duct extending in the direction of elongation of the unitary member and each adapted for connection to a gas supply, a fuel supply and a fuel return respectively, at least one fuel metering and injecting apparatus for each cylinder of the engine each integrated with the unitary member and each comprising a fuel metering means and a fuel injecting means, the fuel metering means being adapted to deliver metered quantities of fuel to the fuel injecting means, each fuel metering means being in communication with the fuel supply and fuel return ducts so that in use fuel can be circulated through each fuel metering means, and each fuel injecting means being in communication with the gas duct and communicable with a respective cylinder of the engine, each said fuel injecting means being adapted to effect delivery of the metered quantity of fuel entrained in gas supplied from the gas duct for delivery to the cylinder.

2. A fuel injection system as claimed in claim 1 wherein a respective fuel cavity is provided in the unitary member to interact with each fuel metering and injection apparatus, the fuel cavity being located to receive the metered quantity of fuel delivered from the fuel metering means and is in communication with the fuel injecting means, said cavity is also in communication with the gas duct, whereby when the fuel injecting means is in communication with the engine, gas from the gas duct flows through the cavity and fuel injecting means to transport the metered quantity of fuel to the engine cylinder.

3. A fuel injection system as claimed in claim 2 wherein a conduit extends from the fuel metering means to the fuel cavity, the conduit being located so the metered quantity of fuel passes from the fuel metering means through the conduit into the fuel cavity.

4. A fuel injection system as claimed in claim 3, wherein the conduit adjacent the location of the entry of the fuel thereinto communicates with the gas duct so that gas passes through the conduit to enter the fuel cavity.

5. A fuel injection system as claimed in claim 4 wherein the conduit extends through an opening in the wall of the fuel cavity, said conduit defining with said opening an annular passage about the conduit, said annular passage providing communication between the gas duct and the fuel cavity, whereby gas flows through the annular passage into the fuel cavity.

6. A fuel injection system as claimed in claim 4 wherein the fuel cavity is configured to present an inclined face opposite the location of the entry of the fuel into the fuel cavity, said face being inclined to the trajectory of the incoming fuel so the fuel rebounding from said inclined face is directed toward the fuel injecting means.

7. A fuel injection system as claimed in claim 4 wherein a gas cavity is provided about the conduit, said gas cavity being in communication with the gas duct, and apertures are provided about the periphery of the conduit adjacent the fuel metering means communicating the gas cavity with the interior of the conduit.

8. A fuel injection system as claimed in any one of claims 2-7 wherein the fuel injecting means comprises a body having an axial bore with a valve controlled delivery port at one end, and communicating at the other end with the fuel cavity in the unitary member, and including electromagnetic means mounted in the body co-axial with the axial bore and operable to selectively open and close said delivery port.

9. A fuel injection system as claimed in claim 8 wherein the valve controlled delivery port includes a valve element adapted to sealably engage the delivery port, a hollow valve stem secured at one end to the valve element, said valve stem extending co-axially along said bore, and means arranged to direct fuel from the fuel cavity into the other end of the hollow valve stem.

10. A fuel injection system as claimed in claim 9 wherein the electromagnetic means comprises a stationary solenoid coil located concentrically about the hollow valve stem, and an armature secured to the hollow valve stem adjacent said other end thereof.

11. A fuel injection system as claimed in claim 9 wherein the hollow valve stem has an aperture in the wall thereof adjacent the valve element to permit fuel to pass from within the hollow valve stem into the axial bore for delivery through the delivery port.

12. A fuel injection system as claimed in claim 9, wherein means are provided to communicate the bore in the body of the fuel injecting means with the gas duct independently of the communication through the hollow valve stem, whereby during delivery of fuel through the delivery port, further gas flows through said communication means and said bore to the delivery port.

13. A fuel injection system as claimed in any one of claims 1, 2, 3, 4, 5, 6 or 7 wherein the injecting means includes selectively openable valve means to establish direct communication between a respective cylinder of the engine and the gas duct.

14. A fuel injection system as claimed in claim 13 wherein the fuel injecting means comprises a body having an axial bore with a valve controlled delivery port at one end, and communicating at the other end with the fuel cavity in the unitary member, and including electromagnetic means mounted in the body co-axial with the axial bore and operable to selectively open and close said delivery port.

15. A fuel injection system as claimed in claim 13 wherein the fuel supply duct and fuel return duct are in a side by side relation with a first internal wall therebetween, each fuel metering means having a body with spaced fuel inlet and fuel outlet ports therein, each fuel metering means being mounted in the unitary member with the body thereof passing through an external wall of the unitary member and said first internal wall with the fuel inlet port communicating with the fuel supply duct and the fuel outlet port communicating with the fuel return duct.

16. A fuel injection system as claimed in claim 15 wherein each fuel injecting means is mounted to the unitary member to project from a further external wall thereof in a direction inclined to the direction of projection into the unitary body of the associated fuel metering means.

17. A fuel injection system as claimed in claim 16 wherein the fuel injection means projects in a direction at right angles to the direction that the fuel metering means projects into the unitary member.

18. A fuel injection system as claimed in claim 15, wherein the external wall and the first internal wall are generally parallel and the body of the fuel metering means extends through said external and first internal walls substantially at a right angle thereto.

19. A fuel injection system as claimed in claim 15 wherein a second internal wall in the unitary member separates the fuel supply duct from the gas duct, the fuel cavity being at least partly formed in said second internal wall, and the body of the fuel metering means extends into said second internal wall to communicate with the fuel cavity to deliver fuel thereto.

20. A fuel injection system as claimed in claim 19 wherein the fuel injection means projects in a direction at right angles to the direction that the fuel metering means projects into the unitary member.

21. A fuel injection system as claimed in claim 13 including pressure regulator means mounted to extend into the unitary member to communicate with the gas duct and one of the fuel supply and return ducts, said pressure regulator means being adapted to in use maintain a predetermined pressure differential between the gas in the gas duct and the fuel in the fuel supply duct.

22. A fuel injection system as claimed in claim 21 wherein the regulator means is adapted to control the rate of flow of fuel from the fuel return duct to a fuel reservoir in relation to the pressure in the gas duct to maintain said predetermined pressure differential.

23. A fuel injection system for an internal combustion engine comprising a body having an internal port cavity, a port in the body providing communication with the port cavity from the exterior of the body, valve means including a valve element adapted to co-operate with the port to close same and a valve stem attached to the valve element and extending through the port cavity, electromagnetic means within the body disposed about and operably connected to the valve stem whereby the valve element is moved to open and close the port when the electromagnetic means is selectively energised and de-energised, a passage through the valve stem communicating the port cavity with a fuel cavity located at that side of the electromagnetic means opposite to the port, metering means to selectively deliver fuel to the fuel cavity, and means to supply gas to the fuel cavity at least when the port is open to convey fuel from the fuel cavity through the valve stem passage and the port cavity to and through the open port.

24. A fuel injection system as claimed in claim 23 wherein the injecting means includes selectively openable valve means to establish direct communication between a respective cylinder of the engine and the gas duct.

25. A fuel injection system as claimed in claim 23 or claim 24 wherein the electromagnetic means comprises a stationary solenoid coil located concentrically about the valve stem; and an armature secured to the valve stem adjacent said other end thereof.

26. A fuel injection system as claimed in claim 25 wherein the armature is located substantially within an annular space formed between the valve stem and the solenoid coil.

27. A fuel injection system as claimed in claim 26 wherein the valve stem extends through the solenoid armature to communicate with the fuel cavity, said valve stem having apertures in the wall thereof adjacent the valve element to permit fuel to the passage within the valve stem into the port cavity.

* * * * *

UNITED STATES PATENT AND TRADEMARK OFFICE
Certificate

Patent No. 4,934,329                                                      Patented: June 19, 1990

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark Lear, Tauranga, New Zealand; Ian R. Thompson, Duncraig, Australia; Sam R. Leighton, Nedlands, Australia; Christopher N. F. Sayer, Ferndale, Australia; and Albert L. Haas, Cass City, MI.

Signed and Sealed this Twenty-Ninth Day of June, 1999.

HENRY C. YUEN
*Supervisory Patent Examiner*
Art Unit 3747